Oct. 11, 1949.  T. H. RHOADS ET AL  2,484,527
METHOD AND APPARATUS FOR CONTROL OF HUMIDITY
Filed Feb. 1, 1945  2 Sheets-Sheet 1

Inventors
Thomas H. Rhoads,
Charles A. Southwick, Jr.
By
Attorney

Patented Oct. 11, 1949

2,484,527

UNITED STATES PATENT OFFICE 2,484,527

METHOD AND APPARATUS FOR CONTROL OF HUMIDITY

Thomas H. Rhoads, Denville, N. J., and Charles A. Southwick, Jr., Mount Vernon, Ohio Application February 1, 1945, Serial No. 575,684

5 Claims. (Cl. 34—46)

It is an object of this invention to provide a method of controlling and adjusting the humidity of air for the purpose of using the conditioned air as a testing medium.

It is a further object of this invention to provide a testing apparatus in which samples may be exposed for any desired period to a predetermined combination of temperature and humidity.

The above and other objects will be made clear from the following detailed description taken in connection with the annexed drawings in which—

Figure 1:
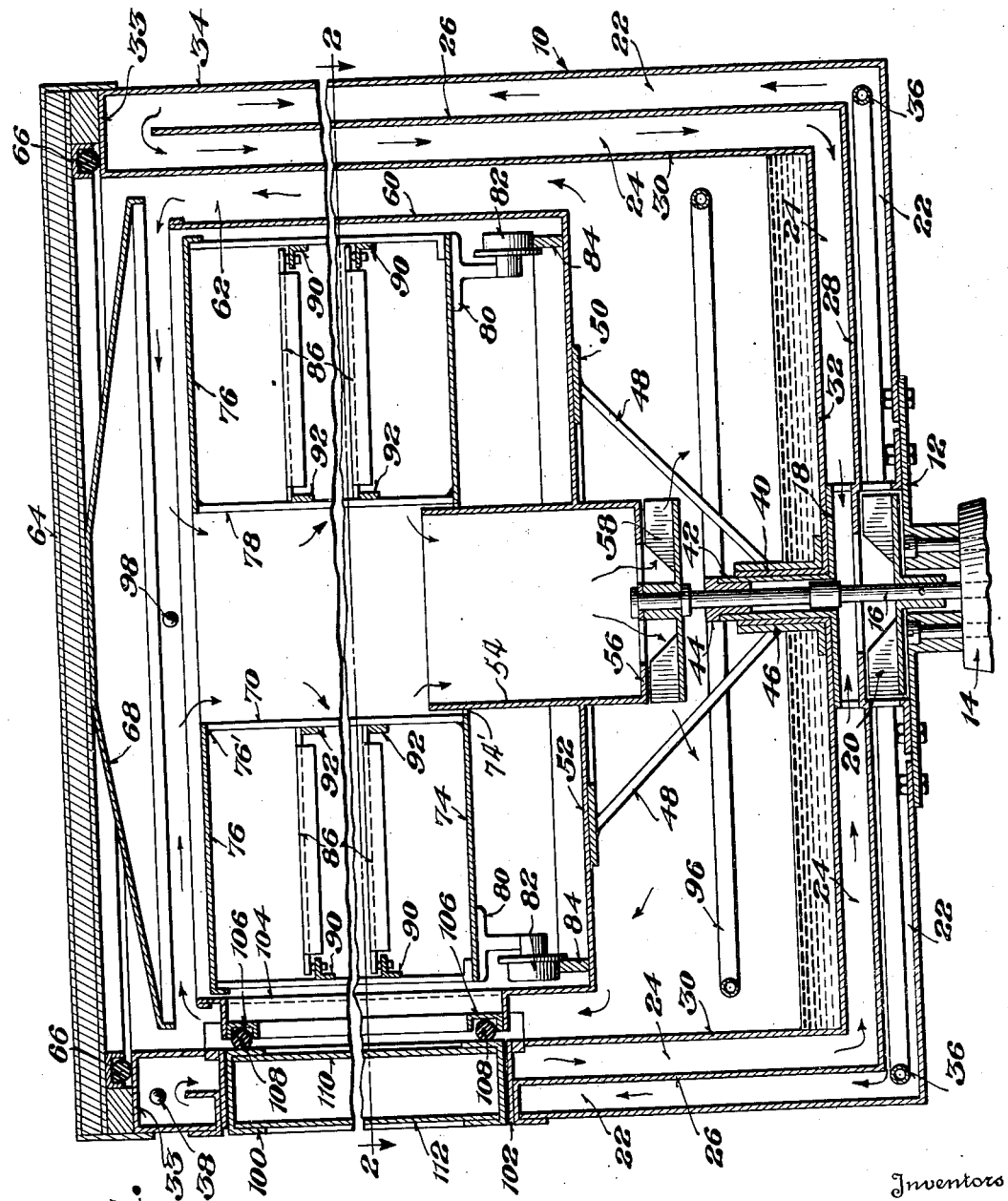
Figure 2:
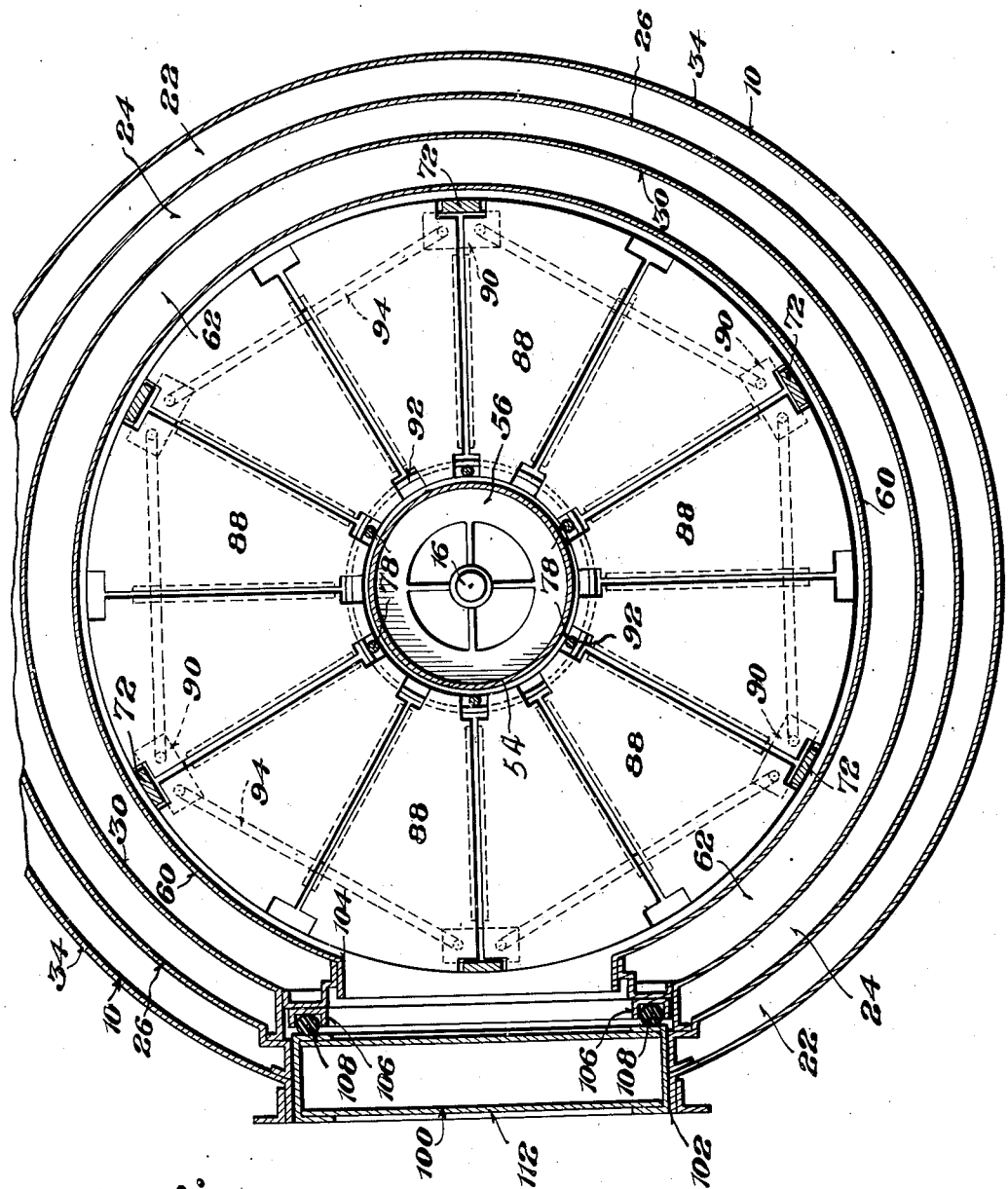

Figure 1 is a central vertical section through an apparatus suitable for carrying out the improved method, and, Fig. 2 is a section on line 2—2 of Fig. 1.

Within the last ten years there has been in the packaging industry an increasing use of impervious materials. These may take the form of imperviously coated paper or laminated glassine or transparent coated films such as "cellophane" or of homogeneous films formed of any of a variety of synthetic materials such as rubber hydrochloride ("Pliofilm") or for example, any of a variety of vinyl polymers or copolymers sold under the names "Vinylite," "Koroseal," "Saran" and many others. When sheet material of any of the aforementioned types is formed in packages, one of the most important properties for which such material is selected is resistance to the penetration of water vapor. Any of these sheets will form substantially a perfect barrier to the transmission of water itself but none of thees completely excludes the penetration of water vapor. At the same time the efficiency of the package formed from such sheets depends in large measure upon the exclusion or retention of moisture vapor from or within the commodity packaged. It is, in fact, indispensible to a proper specification of material that the resistance of the material to moisture vapor penetration be measured with sufficient accuracy to afford an accurate, quantitative comparison between a variety of samples.

This is usually accomplished by using a sample of the sheet to be tested as a seal for a measured quantity of a suitable hygroscopic substance and exposing the specimen to air at predetermined temperature and humidity for a considerable time, after which the gain in moisture content of the hygroscopic material affords a measure of the moisture vapor transmission characteristic of the sheet to be tested.

The regulation of the dry bulb temperature of air is easily accomplished, but the regulation of humidity is an intricate problem. The intricacy, however, lies in the nature of the measurements which must be taken and the calculations in which such measurements are involved. In most practical work, humidity is determined from a computation of the relationship of wet bulb and dry bulb temperatures, and it is, of course, possible through suitable computing apparatus to effect an automatic control of humidity based on these temperatures. Such a control, however, presents extreme practical difficulty when the control must be exerted continuously for a considerable period of time, and, in testing of the type above described, the usual test period approximates 100 hours.

This invention contemplates a method of controlling the humidity of a stream of air by which control is responsive strictly to dry bulb temperatures. From the standpoint of apparatus, the invention not only provides means for carrying out this method but provides a construction having great practical utility for the purpose of testing the moisture vapor characteristics of various materials.

The principles of the improved method will be made clear in the course of describing the details of the improved apparatus.

Figure 1 shows a cylindrical casing 10 secured to a bracket 12 which is mounted on a suitable base 14. A motor (not shown) is mounted within the base 14 and has a shaft 16 extending upwardly into the casing 10. Inside the casing 10, and surrounding the shaft 16, is a frame member 18 which houses a fan 20 secured to the shaft 16 to rotate therewith. Both the side walls and the bottom of the casing 10 are divided into an outer channel 22 and an inner channel 24. A cylindrical baffle 26 separates the inner channel 22 from the outer channel 24 in the region of the side walls and an annular baffle 28 separates the channels in the region of the bottom. The inner limit of the inner channel 24 is defined by a cylindrical wall 30 in the region of the side walls and by a disc 32 at the bottom. The cylindrical wall 30 is joined to the disc 32 and the cylindrical baffle 26 is joined to the wall 28. An annular ring 33 joins the outer wall 34 and the inner wall 30 of the casing 10. The baffle 26 at the upper edge terminates short of the ring 33 to provide communication between channels 22 and 24.

From the foregoing it is clear that the fan 20 delivers a stream of air to the channel 22 which moves upwardly, then over the edge of the baffle 26 and back through the channel 24. A ring-like heating element 36 is provided in the channel 22 adjacent the bottom of the casing 10. A control element 38 is provided adjacent the upper edge of the baffle 26 and controls the temperature of the heating element 36 in accordance with the dry bulb temperature of the air flowing from the channel 22 to channel 24. This provides accurate control of the temperature of the inner wall 30 of the casing 10.

At the center of the ring 32 is an upstanding collar 40 surrounding the shaft 16. An inner collar 42 lies inside the collar 40 and is joined to the housing 18. A bushing 44 is mounted within the collar 42 and forms an upper bearing for the shaft 16. The joint between the outer collar 40 and the disc 32 is formed by welding or other suitable means to provide a watertight joint. A bracket 46 surrounds the collar 40 and has a series of spaced arms 48 extending upwardly therefrom with the upper extremities joined by an annular ring 50.

Concentric with the ring 50 and suitably secured thereto is an annular disc 52. At the center of the disc 52 is an upstanding annular channel member 54 which extends both above and below the disc 52. The channel member 54 at its lower end is partially closed by an annular ring 56. Immediately below the ring 56 is a second fan 58 secured to the upper extremities of the shaft 16. At the outer edge of the annular disc 52 is a cylindrical baffle member 60 extending upwardly beyond the upper terminus of the inner channel 54. The member 60 defines, with the wall 30 of the casing 10, an annular chamber 62. The fan 58 drives air into the channel 62 which air emerges from the channel 62, and returns through the member 54.

The casing 10 is provided with a lid 64 which has a sealed connection 66 with the ring 32 which joins the walls 30 and 34 of the casing 10. A frusto-conical baffle 68 is secured to the lid 64 by any suitable means and serves the dual purpose of guiding the air emerging from the channel 62 back to the member 54 and of returning any condensate which may form thereon back to the chanel 62 rather than permitting such condensate to drip centrally through the member 54.

An inner basket member 70 is provided to hold the actual test specimens. This member is made up of an annular bottom member 74, a similar annular top member 76 with a series of rods 78 joining the peripheries of central openings 76' and 74' of the plates 76 and 74, respectively. At the outer peripheries, plates 76 and 74 are joined by a series of rods 72. At spaced intervals around the outer periphery of the bottom plate 74, are mounted brackets 80 in which are mounted flanged wheels 82 which roll on an annular track 84 secured to the bottom disc 52. This permits the basket 70 to rotate inside the cylindrical baffle 60 for a purpose which will presently be described.

Inside the basket member 70 a number of vertically spaced annular shelves 86 are mounted. Each shelf is made up of a plurality of segments 88 (Fig. 2) which rest at their outer extremities upon brackets 90 secured to the rods 72, and at their inner extremities upon lugs 92 secured to the rods 78. Tie rods 94 join the several segments to prevent lateral shifting or tipping.

A ring-like heating element 96 is provided between the plate 52 of the basket 70 and the inner bottom disc 32 of the casing 10. This heating element 96 is controlled by a thermostat 98 preferably mounted on the central line of the shaft 60 above the top plate 76 of the basket 70. The combination of heating element 96 and the thermostat 98 provides a means for accurate regulation of the dry bulb temperature of air moving under the impetus of the fan 58 through the channel 62 and returning to the fan 58 through the central opening 76' of the top plate 76 and the channel 54. In use, a quantity of water is placed in the bottom of the casing 10 and serves to saturate the air moving under the impetus of the fan 58 so that at the entrance of the annular channel 62 there is delivered saturated air at a predetermined dry bulb temperature.

As previously described, the temperature of the inner wall 30 of the casing 10 is controlled by the combination of the heating element 36 and the thermostat 38. This temperature of the wall 30 is maintained below the dew point of the air entering the channel 62. Since this air is saturated, condensation takes place with the condensate draining down the wall 30 to the bottom of the casing 10.

When the air flows upwardly between the inner wall 30 of the casing 10 and the wall 60, each radial vertical plane may be considered as a longitudinal cross section through an ordinary pipe. The velocity transversely of the section varies in substantially the same manner as does the velocity of a moving column of liquid or gas across the transverse section of a cylindrical pipe. If velocities were plotted vectorially across the section they would form a pattern approximating an axial section through one end of an ellipsoid of revolution. Maximum velocity is attained midway between the walls 30 and 60 and minimum velocity is attained in contact with said walls. It is clear, therefore, that only a minor portion of the total weight of air passing through the conduit has its temperature reduced to that of the wall with which it contacts. The remainder of the air remains saturated and substantially above the ultimate predetermined temperature. The air passing close to the control wall 30 has its temperature reduced and by condensation gives up a portion of its contained moisture. When the air emerges from the channel 62, strikes the baffle 68 and flows radially inward there is a thorough mixing of the molecules producing a resultant temperature lower than the entering temperature of the air and higher than the temperature of the control wall 30. At the same time there is an adjustment of the relative humidity of the whole mass of air to a point below saturation.

It is clear that for a given temperature and rate of flow of saturated air entering the channel 62, and for a given set of dimensions for the channel itself, regulation of the temperature of either or both walls of the channel will provide a positive predetermination of the average temperature and humidity of the air emerging from the channel. In short, control of the temperature of the channel wall or walls affords absolute control of the insulating effect of such walls and therefore absolute control of the amount of heat given up by the air and its entrained moisture in passing through the channel.

The starting point is always saturation at a temperature established at the entrance of the channel but something less than saturation will always be desired at the exit of the channel. For certain combinations of entrance conditions, exit conditions and rate of flow, it may be necessary, in order to extract sufficient moisture to attain the desired relative humidity at the exit, to lower the average dry bulb temperature of the air at the exit below the desired predetermined temperature. In such case, this invention contemplates the use of a supplemental heater at or adjacent the exit of the channel to restore the dry bulb temperature of the air to the predetermined point.

For accurate testing purposes, it is essential that temperature equilibrium be reached throughout the apparatus before the taking of any readings. Any removal of the lid or cover 64 would instantly permit the escape of most of the warm air within the casing 10 and considerable time will be required to re-establish temperature equilibrium. The effect of opening a side wall, however, is far less severe for the reason that there is no direct convection current to remove air from the casing. There is, accordingly, provided in the wall of the casing a door 100. This door may be either circular or rectangular, as desired. In either case, it is mounted in a frame 102 which joins the walls 30 and 34 of the casing 10 to block any communication between the doorway and the channels 22 and 24. The casing 60 has a similar doorway 104, defined by flanges 106 in which are mounted a sealing link or member 108 which has compression sealing with the frame of the door 100. This prevents, so long as the door is closed, any delivery of humid air from the channel 62 to the inner face 110 of the door 100 and tends to prevent, or at least minimize, the formation of condensate on the inner face 110. The face 110 is formed of transparent glass or plastic and there is provided an outer face 112 of similar material. These faces or plates are secured and sealed within the frame of the door 100 by any suitable means and provide an insulating air space while permitting inspection of the interior of the cabinet without the necessity of opening the door 100. The basket 70 being rotatable, it is possible to place on the shelves 86 as many specimens as the shelves will hold merely by opening the door 100 and placing or removing such specimens in the same way, both operations being conducted with a minimum disturbance of thermal equilibrium. So far as the interior of the casing 10 is concerned, the air flowing through the channel 24 provides the precise predetermined insulating effect which is desired. So far as the exterior of the casing 10 is concerned, the use of reflective coatings on either, or both, surfaces of the wall 34 and either, or both, surfaces of the baffle 26, will usually be sufficient to prevent any disturbance of thermal equilibrium by changes in outside atmospheric conditions. This invention contemplates, however, the use of bulk insulating material wherever such use may be desirable. This would include the bottom walls as well as the side walls.

By means of the accuracy of control afforded by the method and apparatus disclosed herein, it is possible to avoid any condensation of moisture in liquid form in contact with the sheet material being tested. Actual liquid in such contact can and usually does completely vitiate the validity of the results. This occurs because in almost all sheet materials there is some soluble matter present. Moisture in the form of liquid in contact with the sheet will dissolve this material. This immediately sets up a transmission of the liquid itself which is probably osmotic in character. Any such transmission of moisture in liquid form, as distinct from vapor form, will seriously affect the results, particulaly where the material being tested has high resistance to moisture vapor penetration, and may therefore be expected to transmit only a very small absolute quantity of moisture.

It is a basic requirement of any testing apparatus that it yield uniform results irrespective of the place in which it is operated, and irrespective (within reason, of course) of the skill of the operator. The cabinet disclosed herein brings the conditioned air in contact with the test samples at minimum velocity. This contributes to the uniformity of results. If air, at any degree of humidity, has any perceptible velocity in moving over the test surface, the results attained are entirely unpredictable. This is because there is no means in existence affording control of the absolute velocity of the molecules of air in contact with the sheet. It is a well-known fact that there is no method by which absolute air velocity even can be measured, let alone controlled. At best, only an average velocity is measurable. The effect of velocity on the test, however, depends on absolute velocity. Since this cannot be controlled, uniformity increases as velocity is minimized.

We claim:

1. A testing device of the class described: comprising at least one annular shelf having a central opening, a cylindrical baffle surrounding said shelf, a cylindrical wall surrounding and spaced from said baffle to define therewith an annular channel, a second cylindrical wall surrounding and spaced from said first named cylindrical wall to define therewith an annular channel surrounding said first named annular channel, means for delivering saturated air at predetermined temperature through said first named channel, means for delivering a fluid medium at predetermined temperature through said second named channel whereby to control the temperature of said first named cylindrical wall and means for guiding air emerging from said first named cylindrical channel into and through the opening in said shelf.

2. A testing device of the class described comprising at least one annular shelf having a central opening, a cylindrical baffle surrounding said shelf, a cylindrical wall surrounding and spaced from said baffle to define therewith an annular channel, a second cylindrical wall surrounding and spaced from said first named cylindrical wall to define therewith an annular channel surrounding said first named annular channel, means for delivering saturated air at predetermined temperature through said first named channel, means for delivering a fluid medium at predetermined temperature through said second named channel whereby to control the temperature of said first named cylindrical wall, and means for guiding air emerging from said first named cylindrical channel into and through the opening in said shelf, the direction of a flow of air through said first named channel being opposite to the direction of flow of said fluid medium through said second named channel.

3. A testing device of the class described; comprising at least one annular shelf to support test specimens, said shelf having a central opening, a cylindrical baffle surrounding said shelf, a cylindrical wall surrounding and spaced from said baffle to define therewith an annular channel, means for delivering saturated air at predetermined temperature through said channel, means for controlling the temperature of said cylindrical wall, and means for guiding air emerging from said channel into and through the opening in said shelf, said baffle and said wall having registering doorways formed therein, a frame surrounding said doorways and connecting said baffle and said wall and blocking access from said channel to said doorways and a door closing said doorways.

4. A testing device of the class described; comprising at least one annular shelf to support test specimens, said shelf having a central opening, a cylindrical baffle surrounding said shelf, a cylindrical wall surrounding and spaced from said baffle to define therewith an annular channel, means for delivering saturated air at predetermined temperature through said channel, means for controlling the temperature of said cylindrical wall, and means for guiding air emerging from said channel into and through the opening in said shelf, said baffle and said wall having registering doorways formed therein, a frame surrounding said doorways and connecting said baffle and said wall and blocking access from said channel to said doorways and a door closing said doorways, said shelf being rotatably mounted about a central axis so that all portions of said shelf may be rendered accessible to said doorways.

5. A testing device of the class described: comprising at least one annular shelf to support test specimens, said shelf having a central opening, a cylindrical baffle surrounding said shelf, a cylindrical wall surrounding and spaced from said baffle to define therewith an annular channel, a second cylindrical baffle surrounding and spaced from said cylindrical wall to define therewith a channel surrounding said first named channel, a second cylindrical wall surrounding and spaced from said second named cylindrical baffle to define therewith a third annular channel surrounding said first and second named annular channels, an annular ring joining said first and second named cylindrical walls and being spaced from the endwise extremity of said second named cylindrical baffle, means for delivering saturated air at a predetermined temperature through said first named channel, means for guiding air emerging from said first named channel into and through the opening in said shelf, means for delivering a fluid medium at predetermined temperature through the last identified channel over the second named baffle and through the second identified channel whereby to control the temperature of the first identified cylindrical wall.

THOMAS H. RHOADS.
CHARLES A. SOUTHWICK, Jr.

REFERENCES CITED

The following references are of record in the file of this patent:

UNITED STATES PATENTS

| Number | Name | Date |
|---|---|---|
| 620,139 | Hysore | Feb. 28, 1899 |
| 963,832 | Tiemann | July 12, 1910 |
| 981,818 | Tiemann | Jan. 17, 1911 |
| 1,442,179 | Schneible | Jan. 16, 1923 |
| 1,853,424 | Harris | Apr. 12, 1932 |
| 2,279,804 | Walz | Apr. 14, 1942 |